(12) United States Patent
Georgiev et al.

(10) Patent No.: US 9,692,669 B2
(45) Date of Patent: Jun. 27, 2017

(54) DETERMINATION OF INTERNET ACCESS

(71) Applicant: Adobe Systems Incorporated, San Jose, CA (US)

(72) Inventors: Evtim Ivanov Georgiev, San Francisco, CA (US); John R. Shapiro, San Francisco, CA (US); Robert Tyler Voliter, Brisbane, CA (US); Kim P. Pimmel, San Francisco, CA (US); Joseph Michael Andolina, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 575 days.

(21) Appl. No.: 13/747,666

(22) Filed: Jan. 23, 2013

(65) Prior Publication Data

US 2014/0207937 A1   Jul. 24, 2014

(51) Int. Cl.
*G06F 15/173* (2006.01)
*H04L 12/26* (2006.01)
*H04L 29/08* (2006.01)

(52) U.S. Cl.
CPC .......... *H04L 43/0811* (2013.01); *H04L 67/02* (2013.01); *H04L 43/10* (2013.01)

(58) Field of Classification Search
CPC ............................. H04L 43/0811; H04L 67/02
USPC .................................................. 709/224, 223
See application file for complete search history.

(56) References Cited

U.S. PATENT DOCUMENTS

2005/0235044 A1\* 10/2005 Tazuma ............ G06F 17/30887
                                                              709/217
2010/0205541 A1\* 8/2010 Rapaport ............... G06Q 10/10
                                                              715/753

\* cited by examiner

*Primary Examiner* — Suraj Joshi
*Assistant Examiner* — Joel Mesa
(74) *Attorney, Agent, or Firm* — Wolfe-SBMC

(57) ABSTRACT

Internet access or connectivity is determined by sending a request to a third-party service to which connectivity is desired with an application on a client computing device and responsive to receiving a response, attempting to rule out a false positive response from an entity other than the third-party service.

39 Claims, 5 Drawing Sheets

DETERMINATION OF INTERNET ACCESS

BACKGROUND

Computing devices typically include applications that utilize third-party services that are made available by way of a server that is accessible via a network such as the Internet. Many on-line vendors or purveyors of goods and services use a dedicated server to help client computing devices and applications ascertain whether they have Internet connectivity. When a client computing device or application wishes to connect to a third-party service, they can typically contact the dedicated server to ascertain whether there is an Internet connection.

The dedicated server typically maintains a dedicated webpage that includes specific content that can be checked by the client computing device or application. Specifically, anytime the device or application wishes to check whether it has connectivity, it contacts the dedicated server and downloads the dedicated webpage. It can then compare the specific content on the dedicated webpage with content that knows should appear on the dedicated webpage. If the content matches, the client computing device or application knows that it has Internet access. Otherwise, if the download fails or the content is mis-matched, the computing device or application typically concludes that there is no Internet connectivity to that particular service and, accordingly, a user interface is presented to the user to prompt them to resolve the problem.

This approach works well except in cases where the vendor's dedicated server has an outage. In this case, if the third-party service is still available through an Internet connection, the client computing device or application will believe there is no connection at all and hence, will not be able to interact with the third-party service.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments enable client computing devices and applications to continue to work with third-party services and applications when an outage affects a server that is configured to enable Internet connectivity checks to be performed. In at least some embodiments, a request is sent to a third-party service with which an application desires connectivity. If a response is received, the application attempts to contact a connectivity check server to ascertain whether Internet connectivity exists. If no response is received from the connectivity check server, the application assumes that the connectivity check server is down and that there is Internet connectivity to the third-party service. If a response is received, the application ascertains whether the response is from the connectivity check server. If the response is received from the connectivity check server, the application concludes that there is Internet connectivity to the third-party service and proceeds with its interactions. If the response is received from an entity other than the connectivity check server, the application concludes that there is no connectivity to the third-party service and takes steps to establish connectivity with the third-party service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Various embodiments enable client computing devices and applications to continue to work with third-party services and applications when an outage affects a server that is configured to enable Internet connectivity checks to be performed. In at least some embodiments, a request is sent to a third-party service with which an application desires connectivity. If a response is received, the application attempts to contact a connectivity check server, e.g., through an HTTP GET request, to ascertain whether Internet connectivity exists. If no response is received from the connectivity check server, the application assumes that the connectivity check server is down and that there is Internet connectivity to the third-party service. If a response is received, the application ascertains whether the response is from the connectivity check server. If the response is received from the connectivity check server, the application concludes that there is Internet connectivity to the third-party service and proceeds with its interactions. If the response is received from an entity other than the connectivity check server, the application concludes that there is no connectivity to the third-party service and takes steps to establish connectivity with the third-party service.

In the following discussion, an example environment is first described that may employ the techniques described herein. Example embodiments and procedures are then described which may be performed in the example environment as well as other environments. Consequently, performance of the example procedures is not limited to the example environment and the example environment is not limited to performance of the example procedures.

Example Environment

Figure 1:
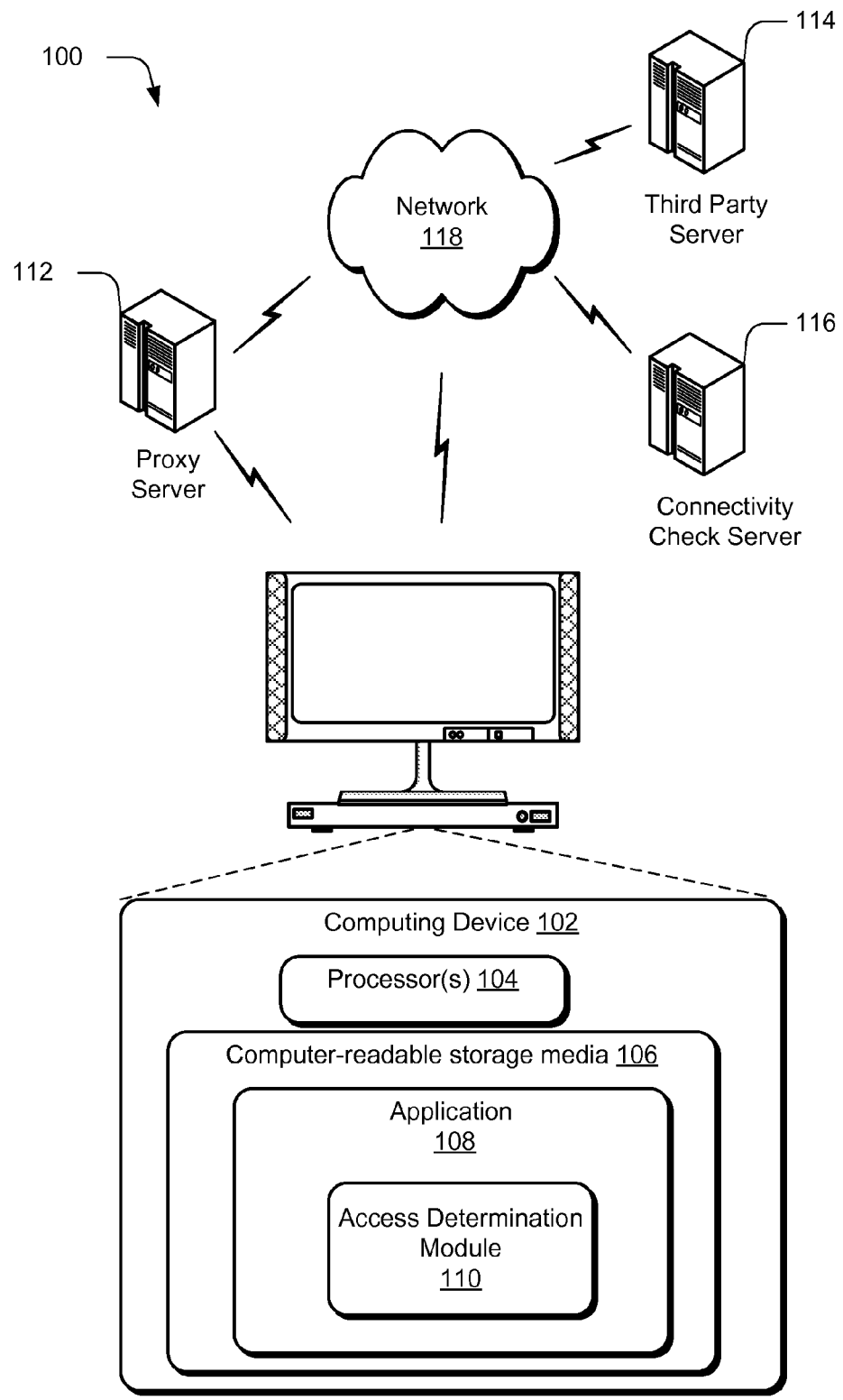
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including one or more processors 104, one or more computer-readable storage media 106, one or more applications 108, and an access determination module 110 also embodied on the computer-readable storage media 106. Although the access determination module 110 is illustrated as comprising part of application 108, it is to be appreciated and understood that the access determination module can comprise a stand-alone module that is utilized by application 108.

The computing device 102 can be configured as any suitable type of computing device. For example, the computing device may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 5.

The environment 100 also includes one or more servers 112, 114, and 116 configured to communicate with computing device 102 over a network 118, such as the Internet or some type of wireless network such as a Wi-Fi network, to provide a "cloud-based" computing environment. The servers 112, 114, and 116 can provide a variety of functionality including, by way of example and not limitation, serving as a remote content source that can be utilized to provide content to computing device 102. The servers can provide various Web-based services such as social networking services, content-sharing services, content storage sources, and the like.

In the illustrated and described example, server 112 is a proxy server that is logically interposed between computing device 102 and network 118. The proxy server acts as an intermediary for requests from computing device 102 or, more accurately, application 108 seeking resources from various other servers. In at least some instances, server 112 enables wireless access to the Internet. To do so, server 112 can present a wireless login page through which the user can login and then subsequently access the Internet. Proxy servers such as this are typically found at wireless access points or "hotspots" such as hotels, airports, coffee shops, and the like.

Server 114 is a third-party server that offers services to various applications. Any suitable services can be offered by the third-party server. Typically, such services are provided to various applications by way of two-way communication that takes place between an application and the third-party server. Services can include, by way of example and not limitation, e-mail services, content sharing services, content aggregation services, social networking services, instant messaging, video conferencing, content streaming, any type of cloud service, application back-end services. and the like.

Server 116 is configured as a connectivity check server that enables various applications to ascertain whether they have Internet connectivity. The connectivity check server 116 may or may not be affiliated with application 108. For example, in an affiliation scenario, the company that developed application 108, e.g., Adobe, may also own and operate connectivity check server 116. Application 108 is knowledgeable of the connectivity check server and understands how to communicate with the server in order to ascertain whether the application has Internet connectivity. In operation, application 108 maintains specific client data that is used to ascertain whether there is Internet connectivity. Any suitable type of data can be utilized such as, by way of example and not limitation, a globally unique identifier (GUID). Additionally, the specific client data can include date/time information and can be encrypted to mitigate the effects of a spoofing attack. When application 108 wishes to do so, it contacts connectivity check server 116 which, in turn, returns a dedicated webpage that has response data. Access determination module 110 then compares the specific client data with the response data returned from the connectivity check server. If the data matches, then the access determination module 110 concludes that the application has Internet connectivity.

As noted above, application 108 can comprise any suitable type of application that can utilize services offered by third-party server 114. In one specific implementation, application 108 can be embodied as an intelligent adaptive content canvas that can enable users to access content, such as photos and videos from various remote sources such as third-party server 114, and consume the content in an adaptive environment that tailors the user experience in accordance with various parameters. The user experience is personalized to the user and is adaptively predictive in a manner that attempts to surface content that the user would likely wish to consume. One example implementation of this functionality is described below in a section entitled "Implementation Example." Further, a more detailed explanation of an example of this type of functionality is described in co-pending application Ser. No. 13/711,913, filed on Dec. 12, 2012, entitled "Intelligent Adaptive Content Canvas", the disclosure of which is incorporated by reference herein.

Having described an example operating environment in which the various inventive principles can be employed, consider now a discussion of how a determination of Internet access can be made in accordance with one or more embodiments.

Determining Internet Access

As noted above, to determine whether an application has Internet access or not, the application can make use of a dedicated server such as connectivity check server 116. The dedicated server typically maintains a dedicated webpage that includes specific content that can be checked by the client computing device or application 108. Specifically, anytime the device or application wishes to check whether it has connectivity, it contacts the dedicated server and downloads the dedicated webpage. It can then compare the specific content on the dedicated webpage with content that it knows should appear on the dedicated webpage. If the content matches, the client computing device or application knows that it has Internet access. Otherwise, if the download fails or the content is mis-matched, the computing device or application typically concludes that there is no Internet connectivity to that particular service and, accordingly, a user interface is presented to the user to prompt them to resolve the problem.

Problems can arise when a proxy server is utilized to access the Internet for purposes of consuming a third-party service. For example, assume that a user takes their computing device to a Wi-Fi hotspot that includes a proxy server. If an application executing on the computing device attempts to ascertain whether it has Internet connectivity by contacting a connectivity check server, it will receive a response from the proxy server that includes data that is different than the data that it would expect to receive from the connectivity check server. Since the data does not compare favorably with client data that resides on the computing device, the application will conclude that it does not have Internet access when, in fact, it very well may have Internet access.

The method about to be described mitigates the effects of this situation, as well as others including connectivity check server outages, in a manner that provides a higher percentage of correct connectivity detection. In addition, the method described below looks to resolve a "false positive" scenario rather than a "false negative" scenario. This means that in some rare cases when a proxy server is preventing the service connectivity, the client application will continue to work as intended, e.g., handling timeouts and connection errors, without explicitly prompting the user that there is no connectivity. In this case, the user can try to resolve any problems in the usual manner, e.g., by trying to load a webpage.

Figure 2:
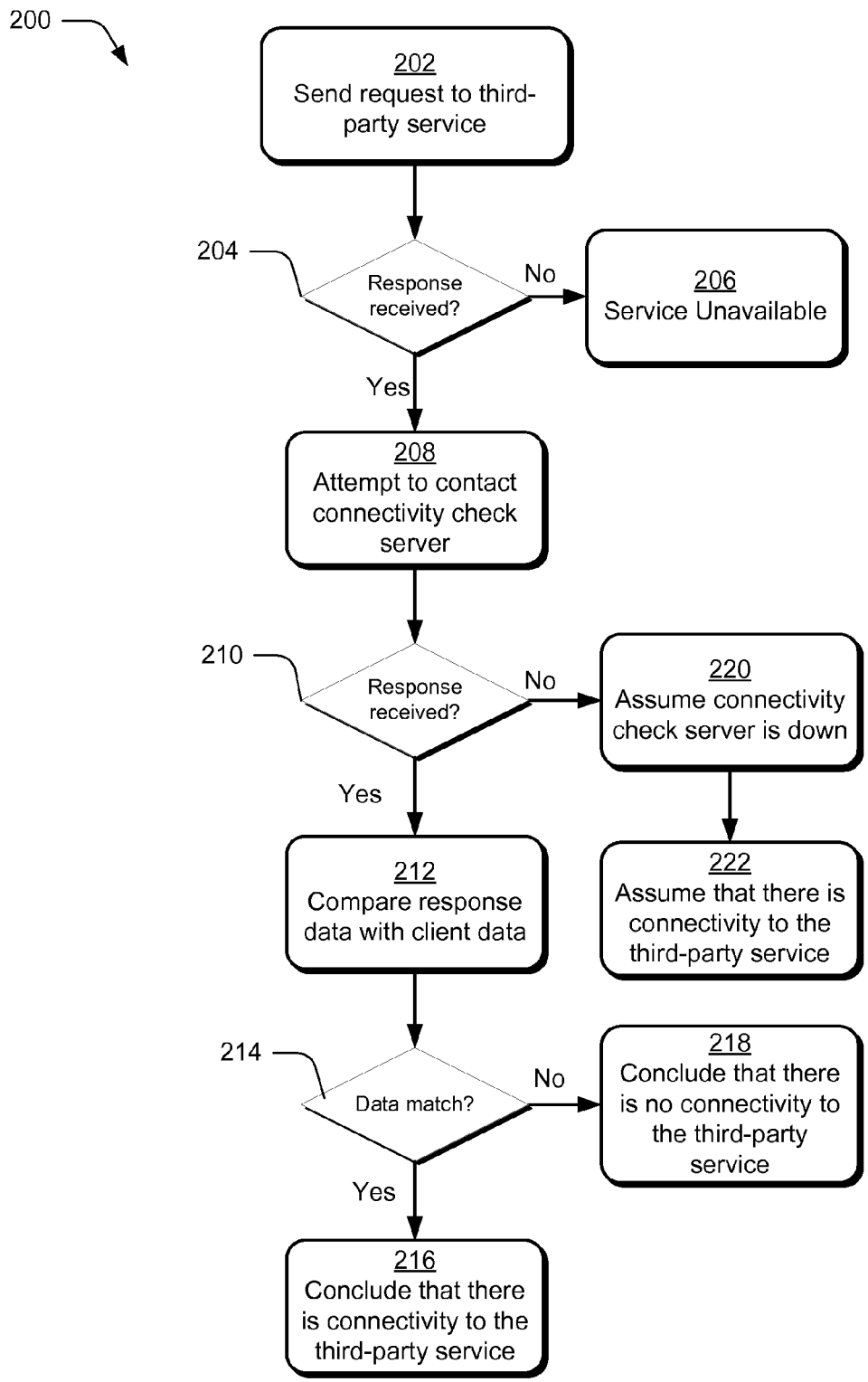
FIG. 2 is a flow diagram depicting a procedure in an example implementation in accordance with one or more embodiments.

FIG. 2 depicts a procedure 200 in an example method in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In the illustrated and described example, procedure 200 can be implemented by a suitably-configured application and/or an access determination module 110 (FIG. 1).

At block 202, a request is sent to a third party service to which connectivity is desired. This step can be performed by a suitably-configured client computing device or application. Any suitable third-party service can be the subject of the request, examples of which are provided above. At block 204, the computing device or application ascertains whether a response is received corresponding to the request. If, at block 204, no response is received, then the client computing device or application concludes, at block 206, that the third-party service is unavailable. Correspondingly, a user interface notification can be displayed that indicates to the user that there is "no connectivity."

If, on the other hand, a response is received at block 204, then a couple of possibilities exist. The first possibility is that the third-party service is up and operating—which is considered as a "positive" response. The second possibility is that there is an intermediate entity, such as a proxy server, responsible for the response—which is considered as a "false positive" response. The proxy server can be one, for example, that is associated with a Wi-Fi hotspot, such as one located in a hotel or airport. The response from the proxy server may be a login page or some other type of content that the proxy server typically returns to an application. The proxy server, as will be appreciated by the skilled artisan, thus prevents access to the service and masks its availability.

Accordingly, the illustrated procedure now attempts to rule out the "false positive" response—that of the response coming from an entity other than the third party service with which connectivity is desired. Specifically, in this example, the client computing device or application attempts, at block 208, to contact the connectivity check server. In the illustrated and described embodiment, the application is affiliated with the connectivity check server. This means that the application is knowledgeable of the information maintained by the connectivity check server and how to interact with it in order to make a connectivity determination. In some instances, the connectivity check server is maintained and operated by the same entity that developed and/or offers the application to consumers.

If, at block 210, a response is received from the connectivity check server, response data that is included with the response is compared, at block 212, with client data that resides at the client computing device or application. Recall that the client computing device or application knows exactly what data it should receive from a properly functioning connectivity check server. If, at block 214, the response data matches the client data, the client computing device or application can conclude, at block 216, that there is connectivity to the third party service. That is, if there is an uninterrupted connection to the connectivity check server, a conclusion can be made that the initial request to the third-party server at block 202 occurred over an uninterrupted connection. This is because had there been a proxy server or some other intervening entity, the response would have been intercepted and replaced with data from the proxy server or other entity. Since this did not occur with respect to the request to the connectivity check server, an uninterrupted connection can be assumed to exist with the third-party service. Accordingly, the client can continue as normally with respect to its interaction with the third-party service.

If, on the other hand, at block 214, the response data and the client data do not match, the client computing device or application concludes, at block 218 that there is no connectivity to the third-party service. This means that the response that was received at block 210 was indeed a false positive—i.e., a response from a proxy server. Responsive to concluding that there is no connectivity to the third-party service, a user notification can be displayed of "no connectivity." In at least some instances, the application can redirect to a browser application which can load the webpage from the proxy server in the case that the proxy server presents such a choice.

Returning back to block 210, in the event a response is not received from the connectivity check server, the client computing device or application assumes, at block 220, that the connectivity check server is down and that the response received at block 204 was not a false positive. That is, the client computing device or application assumes that the response received at block 204 was a response from the third-party service. The client computing device or application then assumes, at block 222 that there is connectivity to the third-party service. The client can then continue to operate normally with respect to its interaction with the third-party service.

Having considered an example method in accordance with one or more embodiments, consider now an implementation which provides but one example of an application that can use the above-described functionality.

Implementation Example

As noted above, application 108 can comprise any suitable type of application. In at least some embodiments, the application can reside in the form of an intelligent adaptive content canvas. The intelligent adaptive content canvas module can enable users to access content, such as photos and videos, and consume the content in an adaptive environment that tailors the user experience in accordance with various parameters. In at least some embodiments, the intelligent adaptive content canvas provides a content canvas that is navigable in various directions and, in a sense, provides a seemingly endless canvas that can be used to surface content to the user in accordance with their navigation activities.

Figure 3:
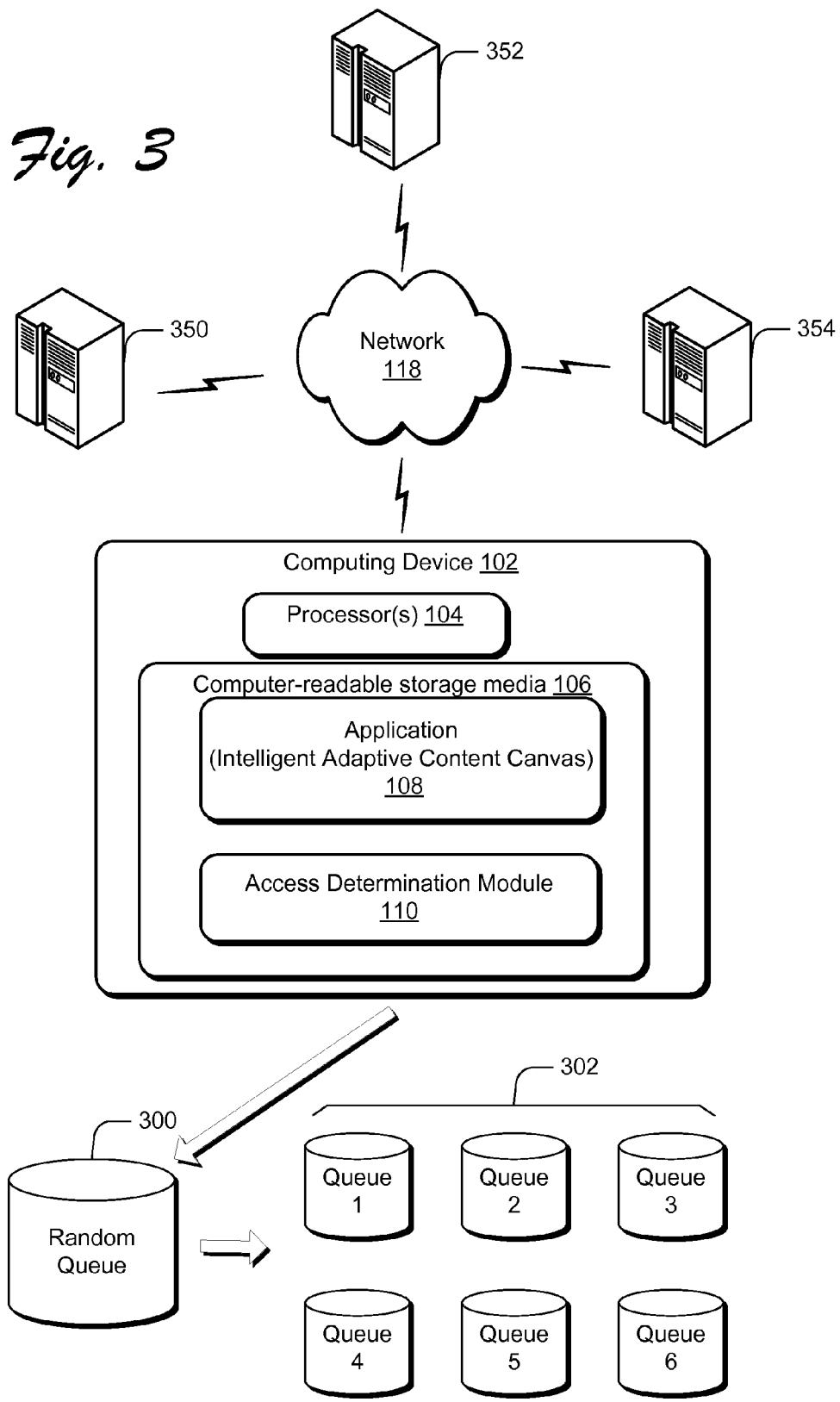
FIG. 3 illustrates an example system in one implementation in accordance with one or more embodiments.

As an example, consider FIG. 3 which shows aspects of the system of FIG. 1, where like numerals depict like components. In at least some embodiments, when a user logs into their computer, they can start or launch the intelligent adaptive content canvas 108 to begin their content consumption experience. The user can also sign into various remote sources where their content may be stored, here represented by services that can be hosted by third-party servers 350, 352, and 354. Remote sources can include social networking sites, content aggregation sites, content storage sites, and the like. The user can also access locally stored content from a local content source. The intelligent adaptive content canvas can then begin pulling content from these various sources as described below.

This content, whether stored locally or remotely, can be considered as user-specific content. User-specific content should be understood to be different from more generalized content such as application icons, website favicons and the like, that might be used across a large number of users.

With respect to remote content sources, the intelligent adaptive content canvas can be configured to save access tokens associated with the remote content sources so that in subsequent sessions, the user can be automatically logged into their respective services so that the content can be pulled from the services without having the user necessarily log into the services. Alternately or additionally, content that is pulled from these services can be cached locally so that in subsequent sessions, the cached content need not be pulled from the services.

As content or content representations (such as unique IDs, content metadata, URIs, service provider specific unique IDs, and the like) are received from remote and/or local content sources, the content or content representations are placed into a random queue 300. In one or more embodiments, content or content representations that are placed into the random queue 300 can constitute unclassified content—that is, content that has not yet been analyzed to provide a classification. Content or content representations that reside in the random queue 300 constitute randomized content that can be used to randomly fill content-fillable containers, as will become apparent below.

Once the content or content representations have been placed into random queue 300, the content can be analyzed to provide one or more classifications. Once classified, the content can then be used to fill the content-fillable containers. This can take place in any suitable way. For example, classified content can be pulled directly from the random queue. Alternately, classified content can be placed into or otherwise associated with one or more specific queues, here represented collectively at 302. In embodiments where content representations (and not the actual content) are used to represent content in the random queue, the content can be loaded during analysis and placed into the appropriate specific queues. Specific queues can be classified in any suitable way. For example, specific queues may exist for "important" content, "family" content, "friend" content, "album" content, and the like.

Content can be analyzed in any suitable way and at any suitable time. For example, content can be analyzed as it is streamed from its source and received. Alternately or additionally, the content can be analyzed as the intelligent adaptive content canvas processes content for placement into the specific queues. Alternately or additionally, content representations can be used, as noted above, to represent content in the random queue. Then, at content analysis time, content can be pulled from its source using the content representations, analyzed and placed into the appropriate specific queue(s).

Content analysis can include, by way of example and not limitation, analyzing whether the content is in portrait or landscape view, whether the content has a particular degree or level of importance (e.g., high importance, medium importance, or low importance), whether the content is in high or low resolution, and the like. Other analysis techniques can be utilized without departing from the spirit and scope of the claimed subject matter. In one or more embodiments, after the analysis is complete, the analysis results are stored in an analysis database so that content that has already been analyzed is not re-analyzed. Now, in subsequent sessions when content or content representations are pulled from the random queue, the analysis database is checked to ascertain whether the content has been analyzed. If so, the content can be placed directly in the appropriate specific queue. If the content has not been analyzed, it can be analyzed and then placed in the appropriate specific queue.

Figure 4:
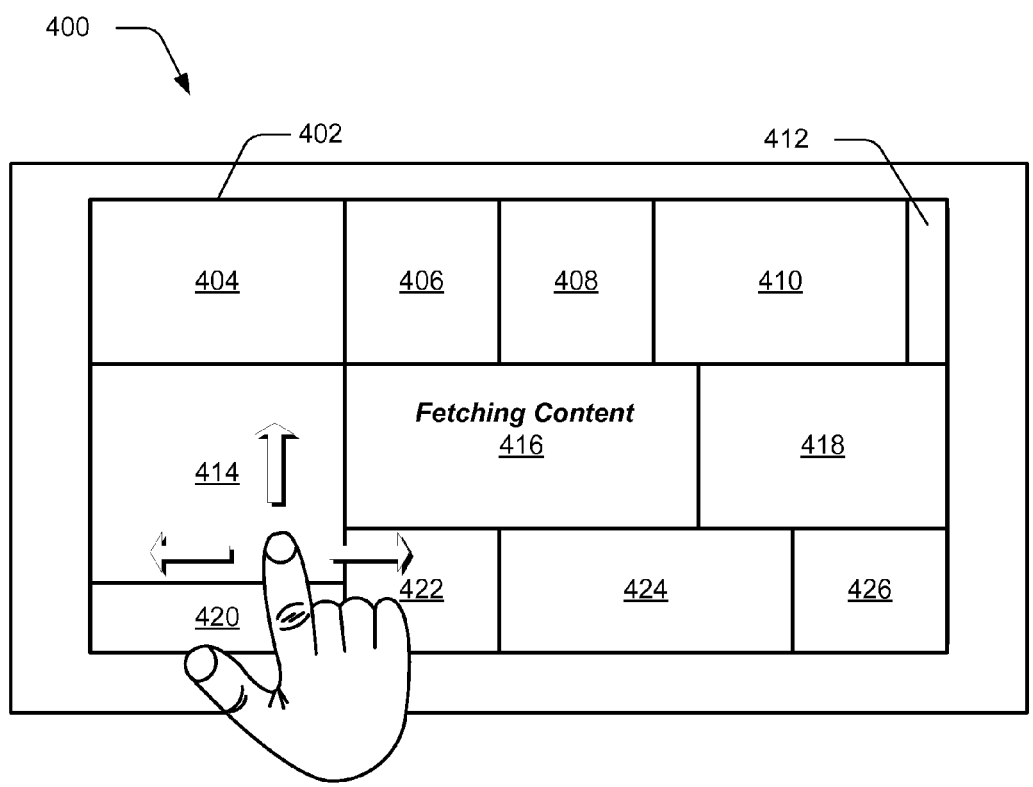
FIG. 4 illustrates an example computing device in accordance with the FIG. 3 implementation.

As an example of content-fillable containers, consider FIG. 4. There, a computing device in the form of a touch-enabled, tablet computer is shown generally at 400 and includes a display screen 402. A plurality of blank, content-fillable containers are shown at 404, 406, 408, 410, 412, 414, 416, 418, 420, 422, 424, and 426. The content-fillable containers collectively make up a template that is to be filled with user-specific content. In addition, a notification "Fetching Content" may be displayed to notify the user that content is currently being fetched and/or analyzed to fill the content-fillable containers. In this example, the display screen 402 includes complete containers such as containers 404 and 406, and partial containers such as containers 412 and 420 that can be accessed by scrolling in a particular direction. For example, the user can scroll left and right horizontally, as well as up and down vertically in the direction of the indicated arrows.

In embodiments that do not employ specific queues, content can be pulled from the random queue 300 (FIG. 3) and randomly placed into appropriately-sized, content-fillable containers. In embodiments that utilize both a random queue and specific queues, when the content or its representation is pulled from the random queue 300, if it has not already been analyzed, it can be analyzed at that time for purposes of placement into a particular content-fillable container, e.g., based on content dimensions, format, etc. . . . Alternately or additionally, if the content has been previously analyzed and classified, the content can be pulled from an appropriate specific queue, such as one of those shown at 302 in FIG. 3.

In the illustrated and described embodiment, as a user scrolls through the content canvas, new templates are generated in a scrolling or navigation direction and contain content-fillable containers which can be subsequently filled with content from the random queue 300 or one of the specific queues. For example, if the user scrolls to the right, those containers that have been filled with content would move visually to the left with new additional containers moving in from the right, with the additional content-fillable containers being generated to be visually contiguous with those containers that have been filled with content. These additional content-fillable containers can be filled with content selected from either the random queue 300 or one of the specific queues. The same holds true if the user were to scroll or navigate to the left or up and down. In this manner, the intelligent adaptive content canvas provides a seemingly endless canvas that can be used to surface content to the user in accordance with their navigation activities.

The implementation example described just above can utilize the principles of the inventive embodiments described with respect to FIGS. 1 and 2. Specifically, the inventive techniques can be employed when attempting to make an Internet connectivity determination relative to third-party servers 350, 352, and 354 (FIG. 3).

Having considered various embodiments and an implementation example, consider now an example system and device that can be utilized to implement one or more of the embodiments described above.

Example System and Device

Figure 5:
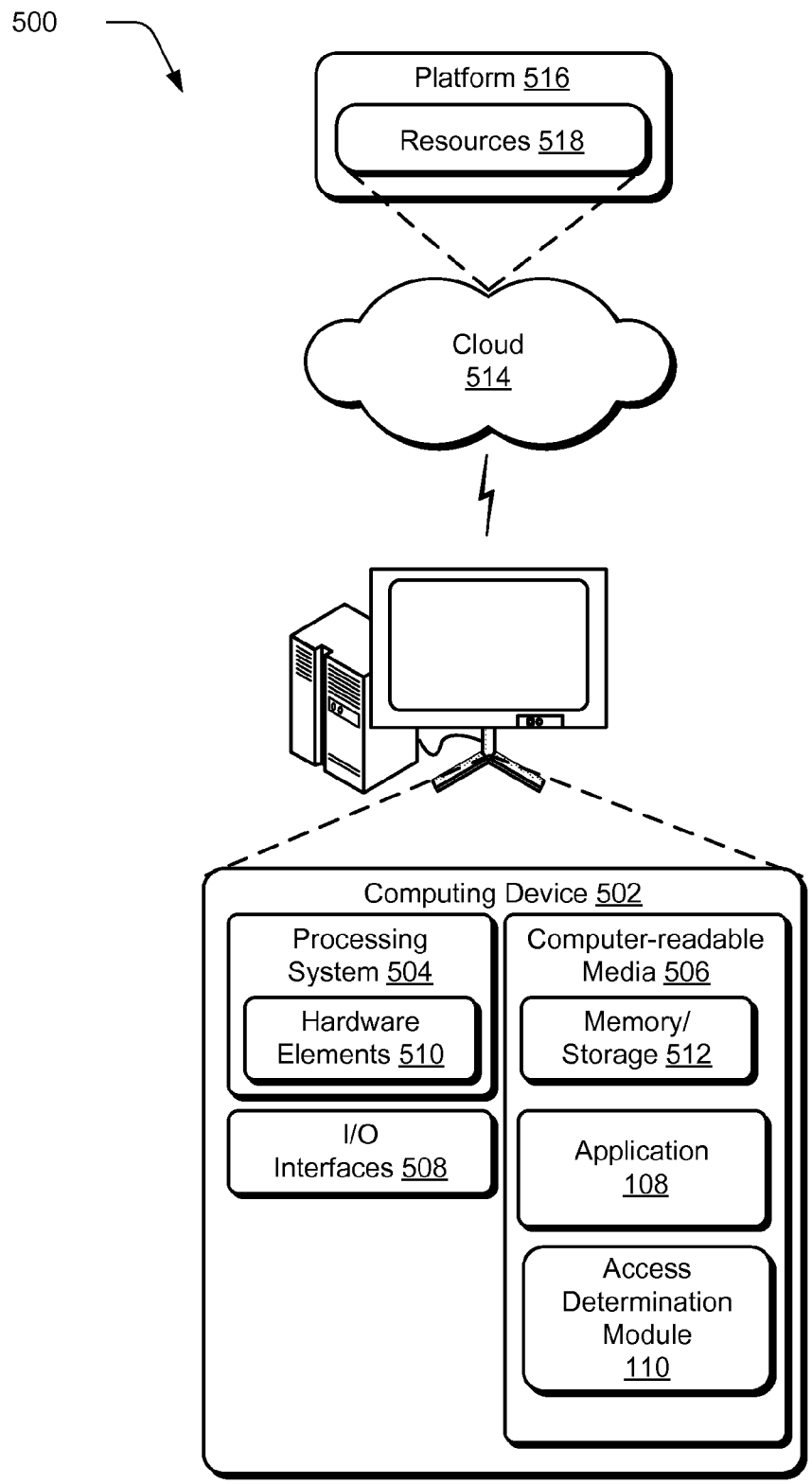
FIG. 5 illustrates an example system including various components of an example device that can be implemented as any type of computing device as described and/or utilize with reference to FIGS. 1-4 to implement embodiments of the techniques described herein.

FIG. 5 illustrates an example system generally at 500 that includes an example computing device 502 that is representative of one or more computing systems and/or devices that may implement the various techniques described herein. This is illustrated through inclusion of application 108 and access determination module 110, which operate as described above. The computing device 502 may be, for example, a server of a service provider, a device associated with a client (e.g., a client device), an on-chip system, and/or any other suitable computing device or computing system.

The example computing device 502 is illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512, application 108, and access determination module 110. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications (such as the intelligent adaptive content canvas module) and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

Various embodiments enable client computing devices and applications to continue to work with third-party services and applications when an outage affects a server that is configured to enable Internet connectivity checks to be performed. In at least some embodiments, a request is sent to a third-party service with which an application desires connectivity. If a response is received, the application attempts to contact a connectivity check server to ascertain whether Internet connectivity exists. If no response is received from the connectivity check server, the application assumes that the connectivity check server is down and that there is Internet connectivity to the third-party service. If a response is received, the application ascertains whether the response is from the connectivity check server. If the response is received from the connectivity check server, the application concludes that there is Internet connectivity to the third-party service and proceeds with its interactions. If the response is received from an entity other than the connectivity check server, the application concludes that there is no connectivity to the third-party service and takes steps to establish connectivity with the third-party service.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a client computing device to ascertain whether Internet connectivity exists for an application to consume content from a third-party service that utilizes, in part, a proxy server to enable consumption of the content or the services, the method comprising: sending a request to the third-party server to which the Internet connectivity is desired by the application executing on the client computing device; ascertaining whether a response to the request is received;
 responsive to not receiving a response, concluding that the third-party service is unavailable and displaying an associated user interface notification; and
 responsive to receiving an initial response to the request, attempting to contact a connectivity check server;
 responsive to receiving an additional response from the attempt to contact the connectivity check server, ascertaining whether the additional response is from the connectivity check server or the proxy server, wherein:
  if the additional response is from the connectivity check server, determining that there is connectivity to the third-party service; and
  if the additional response is from the proxy server, determining that there is no connectivity to the third-party service; and
 responsive to not receiving the additional response from the attempt to contact the connectivity check server, determining that the connectivity check server is down and that there is connectivity to the third party service; and
 responsive to determining that there is connectivity to the third-party service, accessing, by the application of the client computing device, content from the third-party service for consumption.

2. The method as described in claim 1, wherein determining that the response is from the connectivity check server comprises comparing response data in the response with data maintained on the computing device.

3. The method as described in claim 1, wherein determining that the response is from the connectivity check server comprises comparing response data in the response with data maintained on the computing device; and
 further comprising, responsive to the response data matching the data maintained on the computing device, concluding that there is connectivity to the third-party service, otherwise, concluding that there is no connectivity to the third-party service.

4. The method as described in claim 1, further comprising responsive to receiving the response and determining that the response is from the proxy server rather than the connectivity check server, concluding that there is no connectivity to the connectivity check server.

5. The method as described in claim 1, further comprising ruling out a false positive response from the proxy server in response to the computing device receiving the response data from the connectivity check server.

6. The method as described in claim 1, the application being affiliated with the connectivity check server.

7. The method as described in claim 1, further comprising:
determining, based on the response data received at the computing device from the connectivity check server, that an uninterrupted connection to the third-party server exists; and
using the uninterrupted connection to provide the connectivity to the application.

8. The method as described in claim 1, wherein contacting the connectivity check server for the response data is in response to the computing device receiving the response from the third-party service.

9. The method as described in claim 1, wherein the connectivity check server is configured to enable the application to ascertain whether the application has Internet connectivity, and wherein the proxy server is configured to enable access to the Internet as an intermediary when the computing device seeks resources from other servers.

10. The method as described in claim 1, wherein the accessing the content comprises presenting the content in an environment that personalizes the content to a user by adaptively predicting content that the user would likely wish to consume.

11. One or more computer-readable storage media comprising instructions that are stored thereon that implement an access determination module configured to implement a method to enable application connectivity to content or services offered by a third-party service that utilizes, in part, a proxy server to enable consumption of the content or the services, the method comprising:
sending a request to the third-party server to which Internet connectivity is desired by the application executing on a client computing device that includes the access determination module, the third-party server being a remote source of user-specific content, the application comprising an adaptive, navigable content canvas configured to enable access to the user-specific content for consumption in content-fillable containers;
ascertaining whether a response to the request is received;
responsive to not receiving a response, concluding that the third-party service is unavailable and displaying an associated user interface notification;
responsive to receiving an initial response to the request, ascertaining whether the initial response is from the third-party service or the proxy server that is associated with wireless Internet access, the ascertaining comprising:
attempting to contact a connectivity check server;
responsive to receiving an additional response to the attempt to contact the connectivity check server, processing the additional response to ascertain that the additional response is either from the connectivity check server or the proxy server, wherein:
if the additional response is from the connectivity check server determining that there is connectivity to the third-party service; and
if the additional response is from the proxy server, determining that there is no connectivity to the third-party service; and responsive to determining that there is connectivity to the third-party service, accessing the user-specific content from the third-party server for consumption in the content-fillable containers; and
responsive to receiving the initial response, but not receiving the additional response from the request to contact the connectivity check server, determining that the connectivity check server is down and that there is connectivity to the third party service.

12. The one or more computer-readable storage media of claim 11, wherein processing the response comprises comparing response data in the response with data maintained on the computing device.

13. The one or more computer-readable storage media of claim 11, wherein processing the response comprises comparing response data in the response with data maintained on the computing device; and further comprising, responsive to the response data matching the data maintained on the computing device, concluding that there is connectivity to the third-party service, otherwise, concluding that there is no connectivity to the third-party service.

14. The one or more computer-readable storage media of claim 11, wherein the access determination module comprises part of the application.

15. The one or more computer-readable storage media of claim 11, wherein the access determination module is a standalone component from the application.

16. A client computing device comprising:
one or more processors;
a touch-enabled display;
one or more computer readable storage media embodying computer-readable instructions which, when executed under the influence of the one or more processors, implement an access determination module configured to implement a method to enable application connectivity to content or services offered by a third-party service that utilizes, in part, a proxy server to enable consumption of the content or the services, the method comprising:
sending a request to the third-party server to which Internet connectivity is desired by the application executing on the client computing device, the third-party server being a remote source of user-specific content, the application comprising an adaptive, touch-navigable content canvas configured to enable access to the user-specific content for consumption in content-Tillable containers displayed on the touch-enabled display;
ascertaining whether a response to the request is received;
responsive to not receiving a response, concluding that the third-party service is unavailable and displaying an associated user interface notification on the touch-enabled display;
responsive to receiving an initial response to the request, ascertaining whether the initial response is from the third-party service or the proxy server that is associated with wireless Internet access, the ascertaining comprising:
attempting to contact a connectivity check server;
responsive to receiving an additional response to the attempt to contact the connectivity check server, processing the additional response to ascertain that the additional response is either from the connectivity check server or the proxy server, wherein:
if the additional response is from the connectivity check server determining that there is connectivity to the third-party service; and if the additional response is from the proxy server, determining that there is no connectivity to the third-party service; and responsive to determining that there is connectivity to the third-party service, accessing the user-specific content from the third-party server for consumption in the content-fillable containers; and responsive to receiving the initial response, but not receiving the additional response from the request to contact the connectivity check server, determining that the connectivity check server is down and that there is connectivity to the third party service.

17. The client computing device of claim 16, the instructions further comprising ruling out a false positive response from the proxy server in response to receiving a response from the connectivity check server.

18. The client computing device of claim 16, the application being affiliated with the connectivity check server.

19. The client computing device of claim 16, further comprising:

determining, based on response data received at the computing device from the connectivity check server, that an uninterrupted connection to the third-party server exists; and using the uninterrupted connection to provide the connectivity to the application.

20. The client computing device of claim 16, wherein contacting the connectivity check server for the response data is in response to the computing device receiving the response from the third-party service.

21. A method implemented by a client computing device to enable application connectivity to content or services offered by a third-party service that utilizes, at least in part, a proxy server to enable consumption of the content or the services, the method comprising:

sending, by the client computing device, a request to the third-party service to which connectivity is desired with the application on the client computing device;

responsive to ascertaining that no response to the request is received, determining that there is no connectivity between the application and the third-party service;

responsive to receiving a response to the request sent to the third-party service:

contacting a connectivity check server responsive to receiving the response;

responsive to receiving response data from the connectivity check server:

accessing client data from storage on the client computing device;

comparing the response data received from the connectivity check server with the client data accessed from storage on the client computing device; and in response to the comparing, determining that there is connectivity to the third-party service when the response data matches the client data and determining that there is not connectivity to the third-party service when the response data does not match the client data; and responsive to receiving the response to the request sent to the third-party service, and receiving no response data from the connectivity check server, determining that the connectivity check server is down and that there is connectivity to the third-party service; and accessing the content or the services offered by the third-party service for consumption when there is connectivity to the third-party service, including when no response data is received from the connectivity check server.

22. A method as described in claim 21, further comprising ruling out a false positive response from the proxy server in response to the client computing device receiving the response data from the connectivity check server.

23. A method as described in claim 21, the application being affiliated with the connectivity check server.

24. A method as described in claim 21, further comprising:

determining, based on the response data received at the client computing device from the connectivity check server, that an uninterrupted connection to the third-party server exists; and using the uninterrupted connection to provide the connectivity to the application.

25. A method as described in claim 21, wherein contacting the connectivity check server for the response data is in response to the client computing device receiving the response from the third-party service.

26. A method as described in claim 21, wherein the connectivity check server is configured to enable the application to ascertain whether the application has Internet connectivity, and wherein the proxy server is configured to enable access to the Internet as an intermediary when the client computing device seeks resources from other servers.

27. One or more computer-readable storage media comprising instructions that are stored thereon that, responsive to execution by a client computing device, causes the client computing device to enable application connectivity to content or services offered by a third-party service that utilizes, in part, a proxy server to enable consumption of the content or the services by at least:

sending, by the client computing device, a request to the third-party service to which connectivity is desired with the application on the computing device;

responsive to ascertaining that no response to the request is received, determining that there is no connectivity between the application and the third-party service;

responsive to receiving a response to the request sent to the third-party service:

contacting a connectivity check server responsive to receiving the response;

responsive to receiving response data from the connectivity check server:

accessing client data from storage on the client computing device;

comparing the response data received from the connectivity check server with the client data accessed from storage on the client computing device; and in response to the comparing, determining that there is connectivity to the third-party service when the response data matches the client data and determining that there is not connectivity to the third-party service when the response data does not match the client data; and responsive to receiving the response to the request sent to the third-party service, and receiving no response data from the connectivity check server, determining that the connectivity check server is down and that there is connectivity to the third-party service; and accessing the content or the services offered by the third-party service for consumption when there is connectivity to the third-party service, including when no response data is received from the connectivity check server.

28. One or more computer-readable storage media as described in claim 27, further comprising ruling out a false positive response from the proxy server in response to the client computing device receiving the response data from the connectivity check server.

29. One or more computer-readable storage media as described in claim 27, wherein the connectivity check server is affiliated with the application that caused the said request to be sent.

30. One or more computer-readable storage media as described in claim 27, further comprising:
  determining, based on the response data received at the client computing device from the connectivity check server, that an uninterrupted connection to the third-party server exists; and
  using the uninterrupted connection to provide the connectivity to the application.

31. One or more computer-readable storage media as described in claim 27, wherein contacting the connectivity check server for the response data is in response to the client computing device receiving the response from the third-party service.

32. A client computing device comprising:
  one or more processors; and
  one or more computer-readable storage media embodying computer-readable instructions which, when executed under the influence of the one or more processors, implement a method to enable application connectivity to content or services offered by a third-party service that utilizes, in part, a proxy server to enable consumption of the content or services, the method comprising:
  sending, by the client computing device, a request to the third-party service to which connectivity is desired with the application on the computing device;
  responsive to ascertaining that no response to the request is received, determining that there is no connectivity between the application and the third-party service;
  responsive to receiving a response to the request sent to the third-party service:
    contacting a connectivity check server responsive to receiving the response;
  responsive to receiving response data from the connectivity check server:
    accessing client data from storage on the client computing device;
    comparing the response data received from the connectivity check server with the client data accessed from storage on the client computing device; and
    in response to the comparing, determining that there is connectivity to the third-party service when the response data matches the client data and determining that there is not connectivity to the third-party service when the response data does not match the client data; and
  responsive to receiving the response to the request sent to the third-party service, and receiving no response data from the connectivity check server, determining that the connectivity check server is down and that there is connectivity to the third-party service; and
  accessing the content or the services offered by the third-party service for consumption when there is connectivity to the third-party service, including when no response data is received from the connectivity check server.

33. The client computing device of claim 32, further comprising ruling out a false positive response from the proxy server in response to the client computing device receiving the response data from the connectivity check server.

34. The client computing device of claim 33, wherein contacting the connectivity check server comprises sending a request to the connectivity check server indicating a request for the response data.

35. The client computing device of claim 32, the application being affiliated with the connectivity check server such that the application is knowledgeable of information maintained by the connectivity check server.

36. The client computing device of claim 32, further comprising ruling out a false positive response by the connectivity check server by concluding that the response data matches the client data.

37. The client computing device of claim 32, further comprising ruling out a false positive response by contacting the connectivity check server and responsive to not receiving a response from the connectivity check server, concluding that there is connectivity to the third-party service.

38. The client computing device of claim 32, further comprising:
  determining, based on the response data received at the client computing device from the connectivity check server, that an uninterrupted connection to the third-party server exists; and
  using the uninterrupted connection to provide the connectivity to the application.

39. The client computing device of claim 32, wherein the presenting the content comprises presenting the content in an environment that personalizes the content to a user by adaptively predicting content that the user would likely wish to consume.

* * * * *

UNITED STATES PATENT AND TRADEMARK OFFICE
CERTIFICATE OF CORRECTION

PATENT NO. : 9,692,669 B2  Page 1 of 1
APPLICATION NO. : 13/747666
DATED : June 27, 2017
INVENTOR(S) : Evtim Ivanov Georgiev et al.

It is certified that error appears in the above-identified patent and that said Letters Patent is hereby corrected as shown below:

In the Claims

Column 14 Line 47 before "containers", delete "Tillable", insert -- fillable --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*